No. 610,199. Patented Sept. 6, 1898.
W. A. PICKARD.
TRAP.
(Application filed Oct. 23, 1897.)
(No Model.)
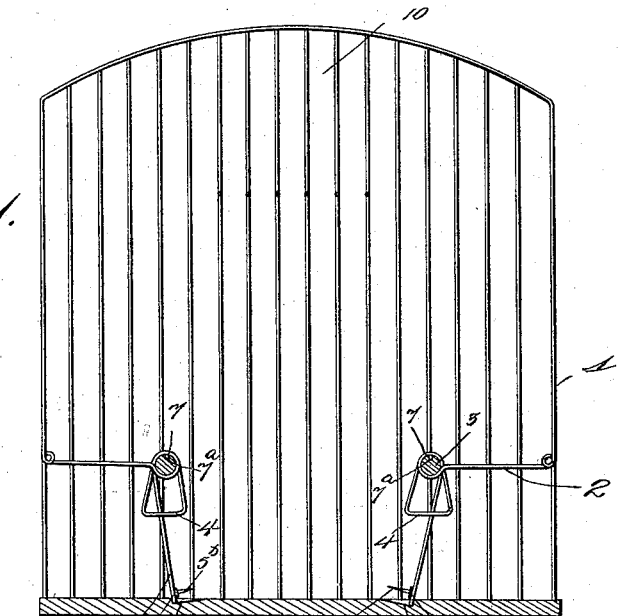
Fig. 1.
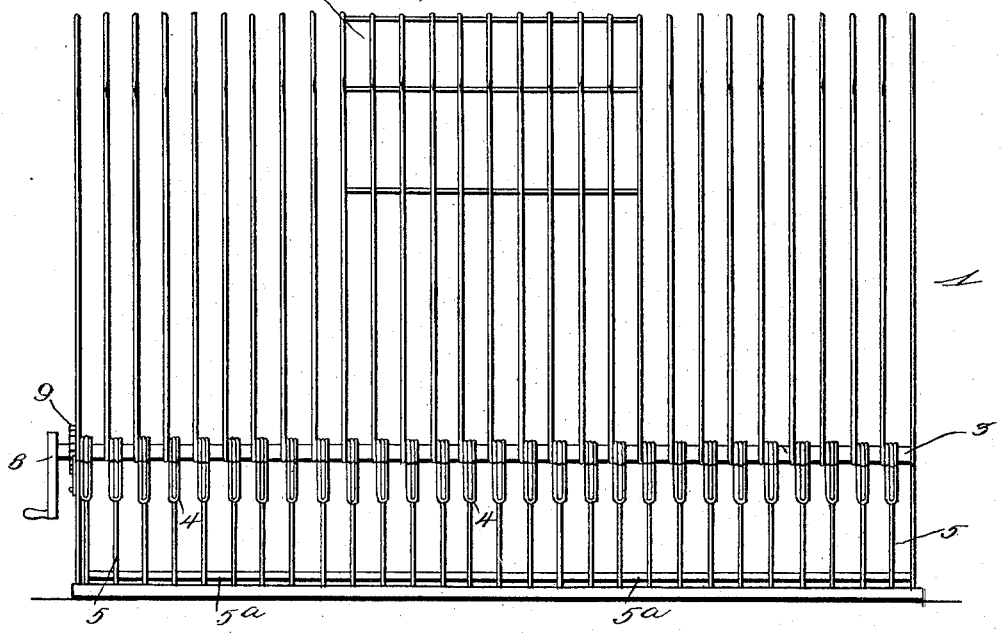
Fig. 2.
Fig. 3.
Witnesses  Inventor
 Wesley A. Pickard,
 by V. D. Stockbridge
 Attorney

UNITED STATES PATENT OFFICE.

WESLEY A. PICKARD, OF EWING, ILLINOIS.

TRAP.

SPECIFICATION forming part of Letters Patent No. 610,199, dated September 6, 1898.

Application filed October 23, 1897. Serial No. 656,170. (No model.)

*To all whom it may concern:*

Be it known that I, WESLEY A. PICKARD, a citizen of the United States, residing at Ewing, in the county of Franklin and State of Illinois, have invented certain new and useful Improvements in Traps; and I do hereby declare the following to be a full, clear, and exact description of the invention, such as will enable others skilled in the art to which it appertains to make and use the same.

This invention has reference to a novel construction in a trap, and which can be used equally as well for entrapping birds, animals, or fish, either large or small, by varying the size and material of which the device is constructed.

The invention consists in the novel features of construction hereinafter fully described and specifically claimed.

In the accompanying drawings, forming a part of this specification, Figure 1 is a vertical transverse section of a trap constructed in accordance with this invention. Fig. 2 is a side elevation. Fig. 3 is a perspective view of a portion of the grooved pivoted rod with one of the pendent fingers attached thereto.

For the purpose of illustration a trap having flat walls is selected, and two of the opposite side walls are constructed in accordance with this invention. The wires 1, forming the walls of the trap, are bent inwardly, as shown by 2, to form a shelf. A transverse rod 3 extends parallel to this wall of the trap, and the wires 2, forming said shelf, are bent around this rod 3, so as to secure the same. Depending from the rod 3 are the guides 4, through which the fingers 5 extend. These guides 4 serve to prevent the lateral displacement of the fingers and as a convenient construction are made by bending the wires 2 around the rod and then downwardly to form these guides. The fingers 5 are secured at their upper ends to the rod 3 and extend downwardly and through the guides 4. The lower ends of these fingers enter sockets 6 in the bottom of the trap, which serves to prevent the lateral displacement of the lower ends of the fingers. The fingers are preferably constructed in pairs—that is to say, a second piece of wire is employed to form two fingers by bending the wire in the center to form a column through which the rod 3 extends, while the end portions extend parallel to each other to form the fingers. The outer end portion of the fingers are connected by cross-pieces $5^a$, having forwardly-extending barbs or pins $5^b$, that jag or stick into the animal or fowl that is entrapped to prevent them from attempting to escape. The said rod 3 is provided with a longitudinal groove 7, while each of the pairs of fingers is provided with a lug $7^a$ to enter said groove in the manner shown. The groove 7 is a little wider than the lugs to permit the vertical play of the fingers, while it serves to limit their forward movement for obvious reasons. The rods 3 are mounted in bearings, so that they can be turned bodily, and at one end are provided with handles 8, while ratchet-plates 9 are employed to prevent the accidental rotation of the rod. By means of the handle the rod can be turned so as to throw the fingers upwardly and upon the shelf formed by the straight wires 2.

In the top of the trap is a basket or receptacle 10, that is closed within the trap, while it is provided with a door or opening from the top, either of which can be closed. This basket 10 is to receive live bait, so as to entrap certain animals, while it prevents the entrapped animal from securing and killing this bait.

A trap constructed in accordance with this invention is adapted for use in entrapping either large or small animals, fowls, or fish, it being noted that the fingers yield to permit the animal to enter, but effectually prevent its escape.

Having thus described the invention, what is claimed as new is—

1. A trap comprising a receptacle having an entrance, a grooved and pivoted rod carrying a plurality of pendent fingers controlling said entrance, and sockets in the bottom of said trap to receive the lower ends of said fingers and hold them in an inwardly-inclined position.

2. A trap comprising a receptacle having an entrance, a transverse bar at the upper end of said entrance having a longitudinal groove and a plurality of fingers having their upper ends bent around said bar with their extremities situated within the groove, and devices for limiting the outward movement of the lower end of said fingers.

3. A trap comprising a receptacle having an entrance, a transverse rotatable bar extending across said entrance, a handle for turning said bar, means for holding the bar against rotation, and a plurality of pivoted fingers carried by said bar and controlling said entrance.

4. A trap comprising a receptacle having an entrance, a transverse, grooved bar pivoted above said entrance, a plurality of pendent fingers secured to said bar, said fingers inclining inward toward their lower ends and being provided with inwardly-projecting barbs or pins, and guides secured to said bar for controlling the movement of said fingers.

In testimony whereof I affix my signature in presence of two witnesses.

WESLEY A. PICKARD.

Witnesses:
S. GRIMES,
D. H. HOUSE.